May 19, 1942.　　F. B. YINGLING　　2,283,842
HYDRAULIC COUPLING
Filed Feb. 25, 1941　　3 Sheets-Sheet 1
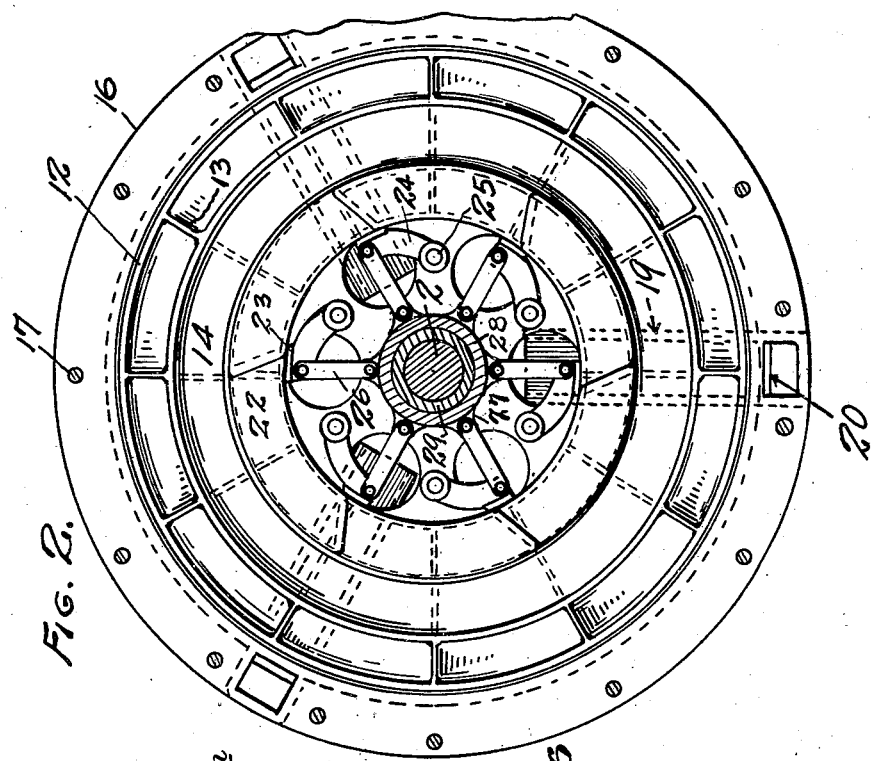
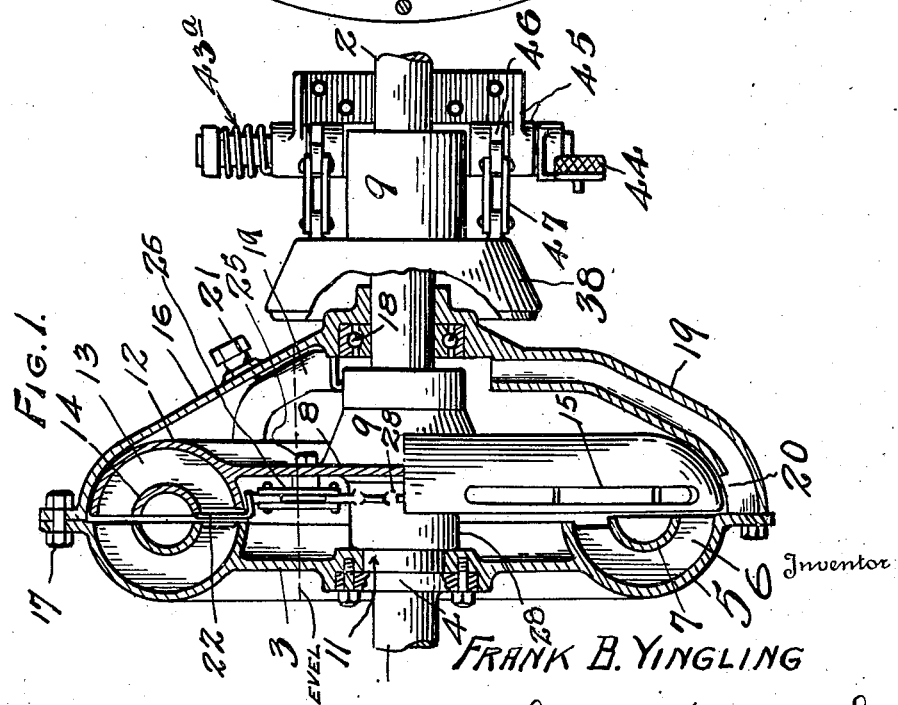
Inventor
FRANK B. YINGLING
By Chas K. Davies & Son
Attorney

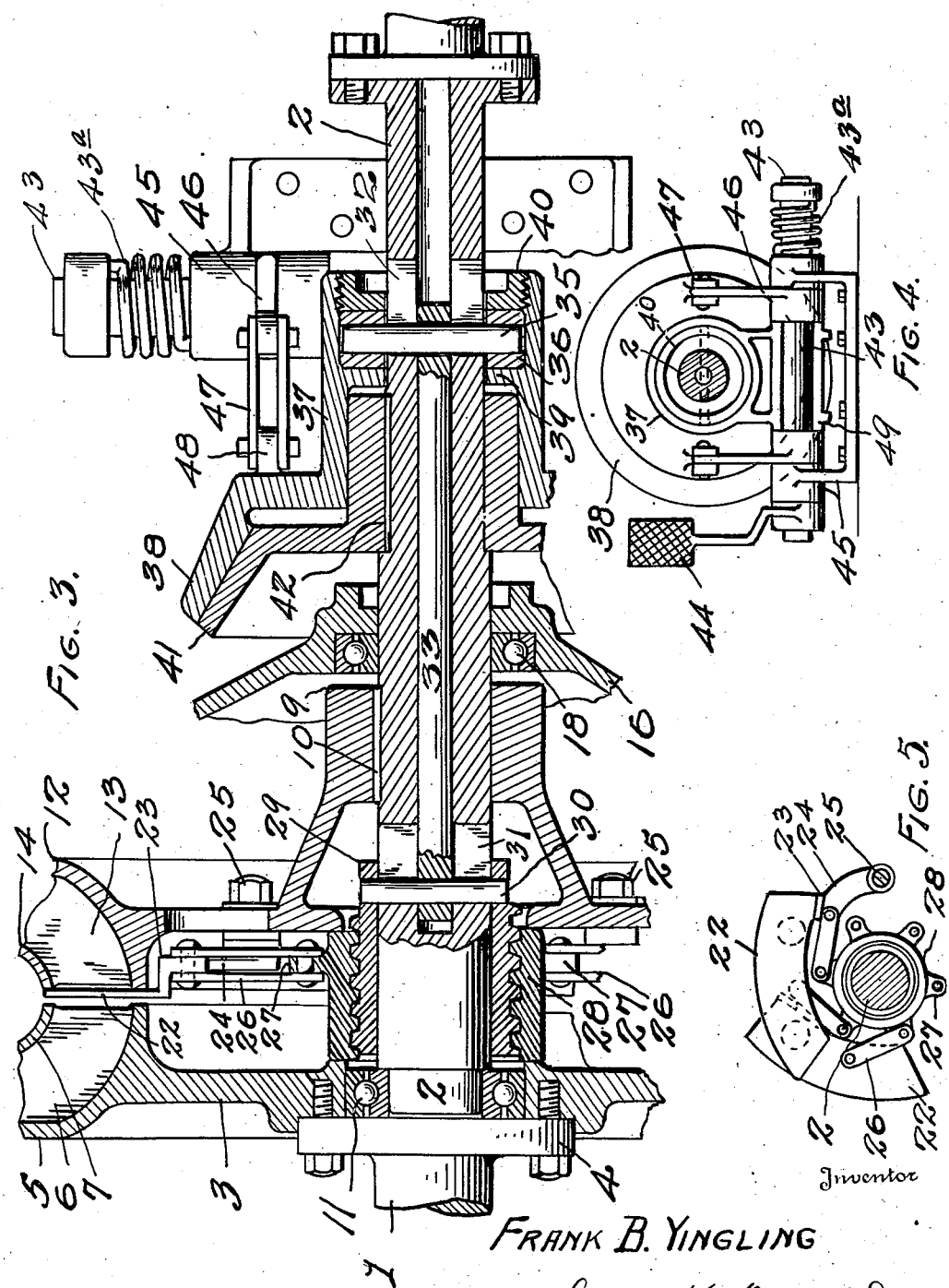

May 19, 1942.　　F. B. YINGLING　　2,283,842
HYDRAULIC COUPLING
Filed Feb. 25, 1941　　3 Sheets-Sheet 3
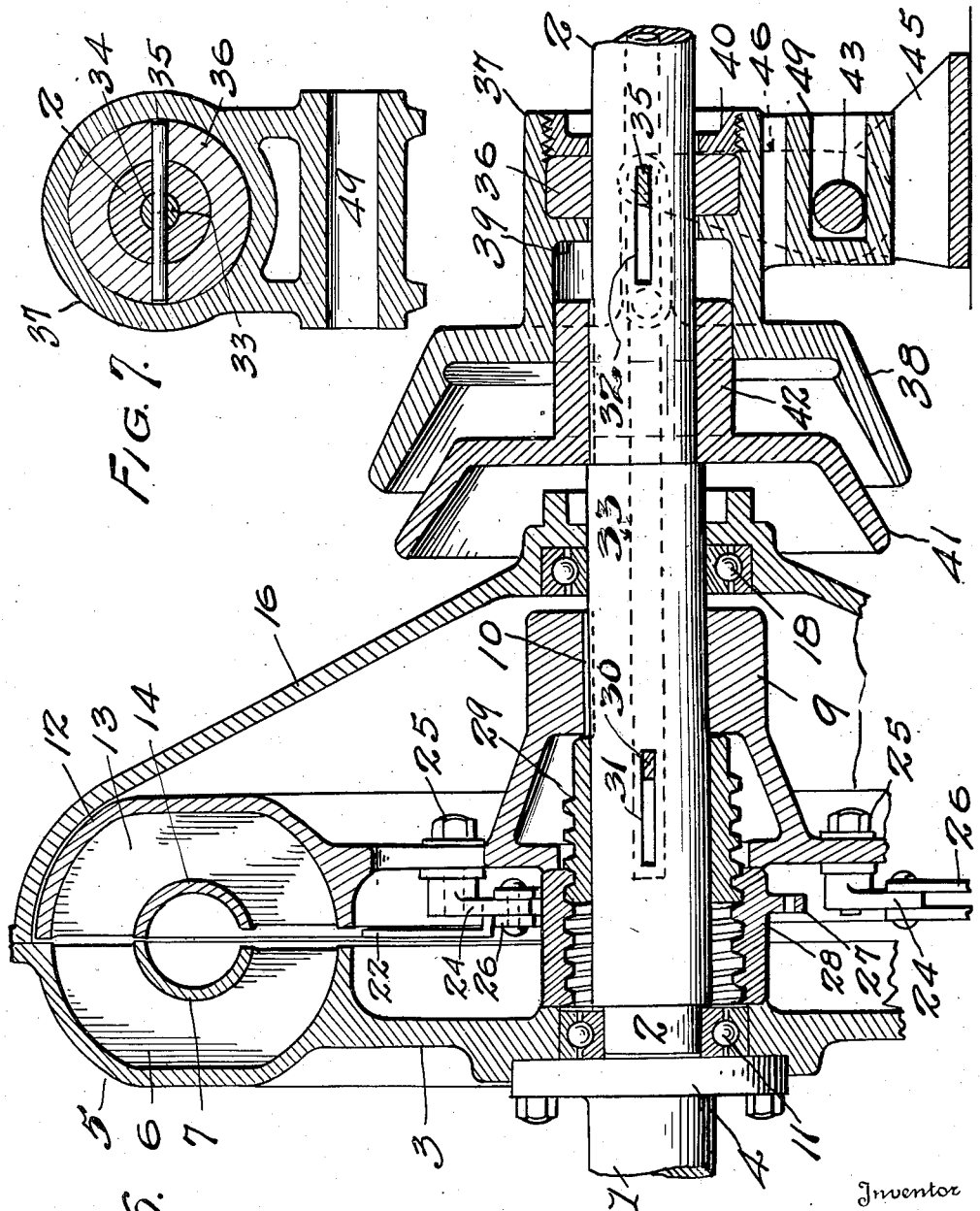
Inventor
FRANK B. YINGLING
By Chas K. Davies & Son
Attorney Patented May 19, 1942

2,283,842

UNITED STATES PATENT OFFICE 2,283,842

HYDRAULIC COUPLING

Frank B. Yingling, Hamilton, Ohio

Application February 25, 1941, Serial No. 380,561

8 Claims. (Cl. 192—12)

The present invention relates to an improved hydraulic coupling by means of which power is transmitted through a rotary drive shaft and its rigid impeller and a fluid coupling to a runner and its rigid driven shaft. The coupling of my invention while adapted for various uses, including the driving or propulsion of automotive vehicles generally, is especially designed for use as the part of a driving mechanism, which includes a motor, as a Diesel engine, and the change-speed gearing or transmission of a railway locomotive.

The primary object of the invention is the provision of means for controlling and varying the speed of the driven parts of the coupling, and for governing the circulation of the fluid coupling or oil within the coupling during the variations of the rotary speed of the runner and driven shaft. These control features, while operable in connection with both light-duty and heavy-duty couplings of this type, are themselves lightly manipulated by an easily operated pedal mechanism for the performance of their functions.

While the coupling is manually or pedal controlled, it is automatic, because of the use of the fluid in the coupling, in adapting or adjusting itself under an excessive load imposed on the driving mechanism, without stalling the continuously operating prime mover or motor; and the coupling, in this adaptation, automatically eliminates undue strains on the mechanism or machinery that is driven through the power transmitting coupling.

In carrying out my invention I employ a drive shaft and an impeller rigid therewith, which impeller also includes a housing-section rotatable with the impeller and drive shaft that performs the functions of a storage reservoir for the oil when the coupling is disengaged and not transmitting power. A runner complementary to the impeller and rigid with the driven shaft is enclosed within the housing, and the impeller and runner form a working chamber or vortex for the coupling. By means of transfer conduits, the oil may be evacuated from the working chamber into the storage chamber, and communication is provided between the storage reservoir and the working chamber whereby the oil under centrifugal action is transferred from the reservoir to said chamber.

A shutter valve movable radially of the coupling and transversely of the alined shafts may be projected into the working chamber to cut off circulation of oil between the impeller and the runner and to effect evacuation of the working chamber; a pedal-operated brake may be applied to the driven shaft to control its speed or to stop its rotation; and the pedal-operated brake co-acts with valve operating mechanism in the control of the valve.

In the accompanying drawings I have illustrated one complete example of the physical embodiment of my invention wherein the parts are combined and arranged according to one mode I have devised for the practical application of the principles of my invention, but it will be understood that changes and alterations may be made in these exemplifying structures, within the scope of my claims, without departing from the principles of the invention.

Figure 1 is a partial plan and partial sectional view of a hydraulic coupling embodying my invention, showing the brake applied and the driven shaft arrested, and also showing the multi-shutter valve closing circulation of fluid between the impeller and the runner.

Figure 2 is an interior face view of the runner, transversely of the coupling in Figure 1, showing the valve shutters closed or outwardly projected, the valve operating means; and also showing the driven shaft in section.

Figure 3 is an enlarged longitudinal sectional view at the axis of the coupling with the shutters of the valve in closed position, similar to Figure 1.

Figure 4 is a detail elevation at the right end of Figure 1 showing the pedal arrangement for the brake.

Figure 5 is a detail view in elevation of parts of the shutters of the valve, and their operating means.

Figure 6 is a detail sectional view similar to the enlarged view of Figure 3, but showing the valve-shutters retracted, or open, while the hydraulic coupling is in power-transmitting condition.

Figure 7 is an end view at the right of Figure 6, partly in section, and showing a connection between the actuating parts of the valve operating means and the driven shaft.

The drive shaft 1 may be the power shaft of a Diesel engine or other motor, and the axially alined driven shaft 2 may be bolted to the main gear shaft in a change speed gearing, when the coupling is interposed between these parts in a driving mechanism.

A circular impeller 3 of the centrifugal pump type is bolted by means of the flange or circular head 4 to the drive shaft, and the drive shaft and impeller revolve with the continuously operating prime motor or engine.

The coupling may be provided with a peripheral working chamber that is circular in cross section, as in Figure 1, or the side walls of the chamber may be flattened, as indicated in the modified form of Figure 6. In either case, the side walls 5 of the working chamber at the impeller side, are provided with interior vanes 6 perpendicular to the longitudinal axis of the coupling, and the impeller is also fashioned with an interior dished ring 7 semicircular in cross section.

The runner 8, complementary to the impeller and fashioned in the form of a turbine, is provided with a hub 9 that is keyed at 10 to the driven shaft, and the inner end of the driven shaft is supported and terminates in bearings 11 mounted in the hub of the impeller adjacent the shaft-head 4, so that the axially alined shafts are capable of relative rotation, as well as capable of rotation in unison.

The runner is fashioned as a mate to the impeller, with its side walls 12, vanes 13, and the dished ring 14, and the impeller and runner together form the pocketed working chamber or vortex of the coupling through which the oil circulates under centrifugal force from the impeller.

In addition to the complementary formation of the runner to the impeller, the runner is fashioned with peripheral exterior ports 15, which, as indicated in Figure 1 may be circumferentially extending slots of appropriate length, or these ports may be arranged as an annular series of holes through the outer wall of the runner.

The ported runner is enclosed with a fluid-tight housing-section 16 that is a conical shape and bolted rigidly to the impeller-section at 17 to revolve with the impeller, and the housing-section, forming an oil reservoir, is supported on bearings 18 mounted on the driven shaft. The housing, as best seen in Figures 1 and 2 is provided with a number of transfer conduits 19, here shown as three in number, which establish communication at all times between the outer periphery of the working chamber and the central part of the housing. These conduits are fashioned partly exterior of and partly interior of the housing with their outer ends terminating in inlet ports 20 adjacent the ports 15 of the impeller and their inner ends terminating in ports opened to the central part of the reservoir. By removal of a filling plug indicated at 21 in Figure 1, the interior of the coupling may be supplied with oil in ample quantity to provide a constant volume of the fluid for circulation through the working chamber, as well as to and from the working chamber and the reservoir.

As best seen in Figure 1 an annular slot is provided in the wall at the inner periphery of the working chamber, between adjoining edges or annular rims of the impeller and the runner through which oil may flow under centrifugal force from the reservoir at the interior of the coupling, outwardly, into the working chamber.

When the coupling is engaged, i. e. transmitting power, the rotating impeller by its centrifugal force maintains a mass of oil in the working chamber, and the kinetic motion of the impeller effects a vortex or mass of rotating oil that circulates transversely of the revolving working chamber from the pockets of the impeller to the pockets of the runner and back again into the impeller pockets, the vortex moving continuously around the central annular core 7—14 of the working chamber.

To disperse or split this vortex of coupling fluid, a valve or barrier is interposed between the impeller and the runner, as indicated in Figures 1, 2, and 3, and the effect of this dispersion is not only to render powerless the coupling in its function as a power converting unit, but the working chamber is also evacuated.

This valve, in the nature of a separator or barrier comprises a suitable number of thin, flat metal plates 22 of arcuate or segmental shape, with slightly overlapping ends when the valve or separator is in closed position in the working chamber, and as indicated in Figure 2 these circumferentially alined plates form a circular separator or valve in the working chamber between the pockets of the impeller and the pockets of the runner. The plates, which are movable through the inner slot that extends around the periphery of the inner wall of the working chamber, are each provided with an offset lug 23 and a rigid arm 24, and the arm is pivoted at 25 to the runner so that the plate may swing in a plane transversely of the longitudinal axis of the coupling, into and out of the working chamber.

For swinging the arm, links 26 couple the arm to an ear 27 on the exterior periphery of a nut 28 mounted within the reservoir indirectly on the driven shaft, and these plates or vanes may be swung from the retracted or open position indicated in Figure 5 to the projected or closed position of Figures 1, 2, and 3, and back again to retracted position, by rotary movement imparted to the nut 28.

The rotary motion of the nut, which imparts reciprocations to the multi-vane or multi-shutter valve or separator, is developed from an exteriorly threaded sleeve 29 forming a screw-head that is non-rotatable, but longitudinally slidable and mounted on a portion of the driven shaft 2, within the reservoir and partially within the hollow hub 9 of the runner. The screw-head is coupled with the driven shaft to revolve therewith through the use of a transversely extending pin 30 that passes through longitudinally extending slot 31 in the shaft, and the forward movement of the screw head is limited by means of the slot and pin mounted on the driven shaft 2.

The screw-head is shifted longitudinally on the driven shaft, from the valve-closed position of Figure 3 to the valve-open position of Figure 6, and vice versa, through the use of a rod 33 slidable in a central opening or bore extending through a portion of the driven shaft. At its rear end, this rod is provided with a pin 35, similar to the pin 30, and the pin 35 is movable in a slot 32 similar to 31 (respectively) of the driven shaft, and the ends of the pin 35 are fixed in a circular or annular collar 36 mounted on the driven shaft and slidable thereon.

The annular collar forms a slide-head movable on the driven shaft, and it is retained within the hollow hub 37 of a non-rotatable brake drum 38. By means of an inner annular flange 39 of the hub and a retaining screw-collar 40 threaded in the hub the slide-head or operating head 36 is rotatable with the driven shaft and through the use of the pin 35 and slot 35a the head is also slidable on the shaft.

The non-rotatable brake drum 38 slides with the slide-head 36, into and out of frictional engagement with the complementary rotatable brake drum 41 having its hub 42 keyed on the driven shaft, and this movement is accomplished through the use of a rock-shaft 43 and the brake pedal 44, and the spring 43a for the rock shaft. The spring 43a is designed to normally hold the brake members out of frictional contact, as when the coupling is transmitting power from the drive shaft to and through the driven shaft.

The rock shaft which extends transversely of and below the driven shaft is mounted to rock in a stationary bearing bracket 45, and the rock shaft has rigid upright lever arms 46, one at each side of the driven shaft, which arms are connected by links 47 to ears 48 on the movable brake drum 38. The hub 37 of the non-rotatable, but slidable brake drum is fashioned with a suitable guide frame 49, horizontally slotted for the rock shaft, and to permit relative sliding movement of the frame while at the same time preventing rotary movement of the brake drum 36.

In Figure 3 the pedal has been operated to frictionally engage the non-rotatable brake drum with the rotating drum 41, thereby reducing, arresting, or stopping the rotation of the driven shaft and the runner, and this operation of the pedal mechanism has also projected the multi-shutter valve or separator into the working chamber of the coupling thereby cutting off or dispersing the vortex in the coupling. Under these conditions the working chamber of the coupling has been partially emptied by flow of oil under centrifugal force from the continuously rotating impeller, and consequently the transmission of power is reduced with a reduction in speed of the driven shaft. Or the working chamber may be wholly evacuated when the driven shaft is stopped, and the impeller continues rotating, by the flow of oil through ports 15—20 and conduits 19 to the interior of the reservoir. When the pedal mechanism is released, permitting spring 43a to disengage the brake members, and also to automatically retract the separator blades or shutters of the valve from the working chamber into the reservoir, and while the impeller is running, centrifugal force created by the impeller throws the oil again from the reservoir into the working chamber. The oil thus restored to the working chamber again forms a vortex or rotating mass of coupling fluid, which imparts power and motion to the runner, for transmission to the driven shaft. In this manner the control of the flow or circulation of oil within the coupling, and the speed of rotation of the driven shaft and its runner, may be varied by the single movement of the pedal that effects both controls.

Having thus fully described my invention what I claim as new and desire to secure by Letters Patent is:

1. In a hydraulic coupling the combination with a drive shaft, a driven shaft, an impeller rotatable with the drive shaft and a complementary runner rotatable with the driven shaft, and said impeller and runner forming an interior, central fluid reservoir and a working chamber, of a valve movable from said reservoir to said chamber and operable to cut off circulation of fluid between said impeller and runner, operating means adapted to project the valve from the reservoir to the chamber, and means operably connected to said valve for arresting rotation of the driven shaft.

2. In a hydraulic coupling the combination with a drive shaft, a driven shaft, an impeller rotatable with the drive shaft and a complementary runner rotatable with the driven shaft, and said impeller and runner forming a working chamber, and an interior central storage reservoir, of a multi-shutter valve movable from said reservoir to said chamber and operable to cut off circulation of fluid in said chamber, operating means adapted to project the valve from the reservoir to the chamber, and means coacting with the valve operating means for arresting rotation of the driven shaft.

3. The combination in a hydraulic coupling having a working chamber and an interior central storage reservoir, a driven shaft, and valve means movable from the reservoir into said chamber for cutting off circulation of fluid in said chamber, of valve operating means, and means operably connected to said valve for arresting rotation of the driven shaft.

4. In a hydraulic coupling, the combination with a drive shaft, a driven shaft, an impeller rotatable with the drive shaft, a complementary runner rotatable with the driven shaft, and said impeller and runner forming a working chamber and an interior central fluid storage reservoir, of valve means mounted on and rotatable with the runner for projecting from the reservoir to the working chamber for closing fluid-circulation in said chamber, valve operating means, and means co-acting with said valve operating means for arresting rotation of the driven shaft.

5. In a hydraulic coupling, the combination with a drive shaft and a rigid impeller, a driven shaft and a rigid runner, and said impeller and runner forming a working chamber and an interior central fluid reservoir, of a multi-shutter valve pivotally mounted in the runner and movable from the reservoir into the working chamber for closing fluid-circulation therein, operating means for swinging the valve-shutters into said chamber, and means co-acting with said operating means for arresting the rotation of the driven shaft.

6. In a hydraulic coupling, the combination with a drive shaft and a rigid impeller, a driven shaft and a rigid runner, said impeller and runner forming a working chamber, a housing rigid with the impeller and forming a storage reservoir, and transfer conduits between said chamber and reservoir, of a multi-shutter valve pivotally mounted in the runner and movable from the reservoir into the working chamber to close communication between said chamber and reservoir, operating means for swinging the valve-shutters into said chamber, and means co-acting with said operating means for arresting rotation of the driven shaft.

7. In a hydraulic coupling having a working chamber and an interior, central fluid storage reservoir and a driven shaft, the combination of a reciprocable separator movable from the reservoir transversely of the shaft into the working chamber, a brake for controlling the speed of rotation of the shaft, rotary means actuated by the braking action, and means for converting movement of said rotary means into reciprocal movement of the separator.

8. In a hydraulic coupling having a working chamber and a partially tubular driven shaft, the combination of a reciprocal separator movable transversely of the shaft into the working chamber, means for reciprocating the separator, a rotary nut for adjusting the reciprocating means, a longitudinally movable screw-head rotatable with the shaft and engaging said nut, a longitudinally slidable rod mounted in the tubular shaft and connected with said screw-head, a brake for controlling rotation of the shaft, and means operative by the braking movement for actuating said rod.

FRANK B. YINGLING.